United States Patent Office 3,487,073
Patented Dec. 30, 1969

3,487,073
PROCESS FOR THE PREPARATION OF ANHYDROUS AMPICILLIN
Arthur C. Adams, West Chester, and Robert P. Deist, Malvern, Pa., assignors to American Home Products Corporation, New York, N.Y., a corporation of Delaware
No Drawing. Filed Sept. 15, 1967, Ser. No. 668,158
Int. Cl. C07d 99/16; A61k 21/00
U.S. Cl. 260—239.1           7 Claims

ABSTRACT OF THE DISCLOSURE

Anhydrous ampicillin is prepared in high yield without the need to isolate and use crystalline hydrated forms as precursors by a process comprising heating a mixture of (1) the β-naphthalenesulfonic acid addition salt of D-6-(2-amino-2-phenylacetamido)penicillanic acid, (2) an amine and (3) an at least partially water-miscible organic solvent with a controlled amount, i.e., at least about 10% by weight, of water, based on solids and total water, bound and free, present.

This invention relates to the production of derivatives of penicillanic acid and more particularly to a novel method for converting a hydrated acid addition salt of D-6-(2-amino-2-phenylacetamido)penicillanic acid to anhydrous ampicillin.

BACKGROUND OF THE INVENTION

The compound D-6-(2-amino-2-phenylacetamido)penicillanic acid per se, also known by the generic term "ampicillin," is of proven value in its broad spectrum antibacterial activity and is useful as a therapeutic agent in poultry and mammals, and particularly in man, in the treatment of infectious diseases caused by Gram-positive and Gram-negative bacteria, upon parenteral or oral administration. It also has use as a nutritional supplement in animal feed.

Ampicillin exists in several hydrated crystalline forms, as well as in an anhydrous crystalline form. One hydrated form, the monohydrate, is known to the art from the disclosure in F. P. Doyle, J. H. C. Nayler and H. Smith, U.S. 2,985,648, in which is taught a relatively complex method for the preparation thereof. Another form of ampicillin, the trihydrate, is described and characterized in H. E. Alburn and N. H. Grant, U.S. 3,299,046. Still another crystalline form of ampicillin is the substantially anhydrous form, described, characterized and claimed by N. H. Grant and H. E. Alburn in U.S. 3,144,445. The present invention is concerned with this anhydrous form of ampicillin.

Anhydrous ampicillin often is desired instead of the hydrated forms, because of its unexpectedly highly advantageous storage stability characteristics. Because of this stability, coupled with its denseness, the efficiency of production of the anhydrous compound in capsule dosage form is increased. As a further advantage, linked to its lesser solublity in water, anhydrous ampicillin exhibits slower absorption in the gut and hence provides prolonged blood levels and more effective action against intestinal pathogens than do the hydrated ampicillins. These factors, including antibiotic utility in human therapy, are discussed in the aforementioned U.S. 3,144,445.

Several means for the preparation of anhydrous ampicillin are known in the art. The means selected has depended on the precursor, which in all cases has been a crystalline hydrate of ampicillin. For example, as is disclosed in U.S. 3,144,445, when the percursor comprises crystalline ampicillin monohydrate, one admirably suitable means comprises heating the crystalline hydrate in the presence of free water at a temperature of from 40° C. to about 100° C. until the anhydrous ampicillin crystals are formed. The heating may best be carried out with the charge of hydrated ampicillin crystals plus water at a pH of from about 3.0 to 7.0. Preferably the free water is present in an amount that is at least 50% by weight of the charge, and the heating is applied to the charge under vacuum until the dry anhydrous ampicillin product is obtained. In an alternative procedure, the required heat and water may be supplied by directly steaming crystals of ampicillin monohydrate. When, on the other hand, the precursor comprises crystalline ampicillin trihydrate, the above-outlined method is not effective, and a means such as that disclosed in the aforesaid U.S. 3,299,046 is employed. This comprises, generally, preparing a mixture of the crystalline trihydrate, at least some free water, and a water-miscible organic solvent and heating the mixture to a temperature of from about 50° C. to about 100° C., then recovering the crystalline anhydrous form. Any of the mentioned procedures requires the use of isolated crystalline hydrates of ampicillin and the isolation of these from the dilute mixtures after their synthesis represents costly and time-consuming processing operations because of the relatively large amounts of water (and, in some cases, organic solvents) to be removed before crystallization. Most of the earlier methods for isolation of the crystalline hydrates involved evaporation of large volumes of water (or solvent) at low temperature—for example, freeze-drying is used on a small scale. In more recent procedures, the crystalline hydrates are recovered by treatment of the dilute solution of ampicillin with an acid, such as an aryl-sulfonic acid, for example, β-naphthalene sulfonic acid, forming an addition salt which precipitates from the dilute reaction mixture and from which the hydrated ampicillin can be recovered by acidification, reconstitution of the precipitate and decomposition of the salt. It is noteworthy also to mention that even with the more recent acid precipitation procedure the crystalline trihydrate of ampicillin is extremely difficult (slow) to filter and this often tends to slow down production of the anhydrous form if the trihydrate is used as a precursor, especially on a large scale. Furthermore, if the trihydrate is the percursor, sometimes there is obseved the tendency for the mixture to become thick and gelatinous. It would be desirable therefore to provide a means to obtain anhydrous ampicillin which does not require the use of an isolated crystalline hydrated ampicillin as a precursor. It has surprisingly and unexpectedly now been found that, if the means of the instant invention is used, an arylsulfonic acid addition salt of ampicillin can be converted directly to anhydrous ampicillin, and in higher yield, than generally is possible starting from hydrated crystalline precursors.

It is, accordingly, a primary object of the instant invention to provide anhydrous ampicillin in good yield and in a high state of purity.

It is a further object to provide anhydrous ampicillin without the need to isolate and use crystalline hydrated ampicillins as precursors.

Still another object of the instant invention is to provide anhydrous ampicillin from the product which precipitates after treating a dilute ampicillin-containing medium with an aryl sulfonic acid.

A further object of the instant invention is to provide anhydrous ampicillin by a means which avoids the need to isolate and use the crystalline trihydrate of ampicillin as a precursor, and which precludes the formation of the said trihydrate in any stage of the process.

Still another object of the present invention is to provide anhydrous ampicillin in a nearly instantaneous conversion without going through the thick gelatinous stages observed in prior art procedures.

DESCRIPTION OF THE INVENTION

These and other objects readily apparent to those skilled in the art are easily achieved by practice of the means of the instant invention which is, in essence: A method for the preparation of the anhydrous crystalline form of D - 6 - (2 - amino - 2 - phenylacetamido)penicillanic acid, which method comprises heating at a temperature of from about 50° C. to about 100° C. a mixture comprising (1) the acid addition salt of D-6-(2-amino-2-phenylacetamido)penicillanic acid with β-naphthalene sulfonic acid, (2) at least about 1 equivalent, based on said salt, of an amine of the formula

wherein R and R¹ are, independently, hydrogen, (lower)-alkyl or phenyl-substituted-(lower)alkyl, and (3) a reaction medium comprising, (a) a water-miscible organic solvent capable of dissolving at least 5% thereof of water, and present in an amount that is at least 20% by volume of said medium, and (b) sufficient free water to bring the total amount of bound and free water in the mixture to at least 10% by weight based on solids and total water present until formation of said anhydrous crystalline form is substantially complete.

Special mention is made of a number of valuable embodiments of this invention. These are:

A method as first above defined including the steps of separating and recovering said anhydrous crystalline form of D-6-(2-amino-2-phenylacetamido)penicillanic acid substantially free of the by-product amine-β-naphthalene sulfonic acid addition salt, water-miscible organic solvent and free water components in said mixture.

A method as first above defined wherein said acid addition salt is in the form of a monohydrate and said amine is diethylamine.

A method as first above defined wherein said acid addition salt is in the form of a monohydrate and said amine is ammonia.

A method as first above defined wherein said water-miscible organic solvent comprises from about 50% to about 95% by volume of said medium and said heating occurs in the temperature range of from about 60° C. to about 85° C.

A method as first above defined wherein said water-miscible organic solvent is isopropanol which comprises about 85% by volume of said medium and said heating occurs in the temperature range of from about 70° C. to about 80° C.

A method as first above defined wherein, prior to heating, the said mixture is prepared by adding about two equivalents of said amine to a suspension of about one equivalent of said acid addition salt in said reaction medium then adding about one equivalent of a strong mineral acid.

A method as next above defined wherein said amine is diethylamine and said strong mineral acid is hydrochloric acid.

A method as first above defined wherein the said mixture is prepared by adding about one equivalent of said acid addition salt to about 2 equivalents of said amine and about 1 equivalent of a strong mineral acid in said reaction medium heated to a temperature range of from about 50° C. to about 100° C.

A method as next above defined wherein said amine is diethylamine and said strong mineral acid is hydrochloric acid.

A method as first above defined wherein the said mixture is prepared by adding about one equivalent of said acid addition salt to a warm solution of about one equivalent of amine in said reaction medium heated to a temperature range of from about 50° C. to about 100° C.

A process as next above defined wherein said amine is diethylamine and the water-miscible organic solvent in said reaction medium is isopropanol.

A process which is an embodiment of that immediately prior to the next above defined wherein the said mixture is prepared in a step-wise fashion by adding increments of said acid addition salt to stoichiometrically-equivalent increments of said amine in said warm solution, whereby said acid addition salt is never exposed to high concentrations of said amine for a prolonged time.

A process as next above defined wherein said amine is diethylamine and the water-miscible organic solvent in said reaction medium is isopropanol, and said temperature range is from about 70° C. to about 80° C.

The acid addition salt of D-6-(2-amino - 2 - phenyl-acetamido)penicillanic acid with β-naphthalene sulfonic acid can be prepared in a variety of ways. One especially convenient means is to treat a solution of ampicillin (prepared, for example, by admixing 6-aminopenicillanic acid and D-phenylglycine N-carboxy anhydride in a weight ratio of about 10 to 4.5 with about 100 to 150 parts by weight of water, and adjusting the pH of the aqueous system to within a preferred pH range of from about 4.8 to about 6.0 by addition of an alkaline material, e.g. NaOH, substantially as described in U.S. 3,299,046) with a solution or suspension in water or an organic solvent, such as ethyl acetate, containing a stoichiometrically equivalent amount (or, preferably, up to about a 20% excess) of β-naphthalene sulfonic acid, maintaining the mixture until precipitation of the crystalline acid addition salt is substantially complete, and then filtering off the crystals, in accordance with well known recovery procedures. For example, the aqueous reaction mixture containing ampicillin is diluted with water and the pH of the solution is adjusted to 1.8–2.0 with dilute hydrochloric acid. After clarifying the acidic aqueous solution by filtration, about one-tenth volume of ethyl acetate is added and then a 50% weight/volume solution of β-naphthalene sulfonic acid in ethanol containing a stoichiometrically-equivalent amount plus a 20% excess of active agent is added dropwise with stirring while maintaining a pH of 1.5–1.8 by concurrent addition of dilute sodium hydroxide. After stirring for about twelve hours at 2–5° C., the white, crystalline β-naphthalene sulfonic acid addition salt of ampicillin is collected by filtration, washed thoroughly with cold water and finally with ethyl acetate. It is preferred to use the salt in the form of a monohydrate in a wet filter cake and, generally speaking, one prepared as above containing 34 to 41% solids as shown by drying at 65–70° C., approximately 20 to 25% by weight of water by Karl Fischer titration, and approximately 34–46% of either additional water or an organic solvent, such as ethyl acetate, by difference, is especially suitable.

With respect to the amine used in the preparation of the instant reaction mixture, generally speaking a broad variety of primary, secondary and tertiary aliphatic amines, and ammonia, can be employed. It is desirable that the amine employed form a β-naphthalene sulfonic acid addition salt which is soluble in the reaction mixture. The preferred amines are embraced by the formula

wherein R and R¹ are, independently, hydrogen or (lower) alkyl of from about 1 to about 6 carbon atoms, or phenyl-substituted - (lower)alkyl, the (lower)alkyl groups, in either case, being straight chain or branched. Included therefore are ammonia and primary and secondary lower aliphatic and phenyl-substituted-(lower)aliphatic amines, illustrative members of which are methylamine, ethylamine, n-propylamine, i-propylamine, n-butylamine, t-butylamine, n-pentylamine, n-hexylamine, 3-methylpentylamine, benzylamine, 6-phenyl-n-hexylamine, dimethylamine, diethylamine, di-n-propylamine, di-i-propylamine, di-n-butylamine, di-t-butylamine, di-n-pentylamine, di-n-hexylamine, di-(3-methylpentyl)amine, dibenzylamine, di-(6-phenyl-n-hexyl)amine and the like. Especially preferred amines for reasons of ready availability and economy are ammonia and diethylamine.

The term "strong mineral acid" contemplates inorganic acids such as hydrochloric, sulfuric, phosphoric, nitric and the like. Especially suitable is hydrochloric acid.

With respect to the reaction medium, it has been discovered that the environment should contain, in addition to water, an organic solvent, which is preferably entirely miscible with water, or partially miscible with water at least to the extent that the organic solvent will retain 5% by volume of water in solution. For example, acetone, ethanol, isopropanol, n-propanol, n-butanol, ethylene glycol, ethylene glycol monomethyl ether, and dioxane, which meet the aforesaid requirements with respect to miscibility with water, have been found to be eminently suitable for use as the requisite organic solvent, and, in certain instances, even when included in proportions up to 95% of the aqueous environment. However, with respect to the last, it has been found that the total water present in the processing mixture containing the acid addition salt solids and furnished as both free and chemically bound water, must constitute at least about 10% by weight based on solids and total water present to obtain the desired conversion to the anhydrous ampicillin. On the other hand, when the organic solvent is present in the environment in concentrations of less than 20% by volume of said environment, the salutary effect of the solvent for permitting transformation of the acid addition salt to the desired anhydrous ampicillin is not in evidence.

The surprising nature of the novel method of the invention is demonstrated by the fact that other common organic solvents such as n-amyl alcohol, n-hexyl alcohol, methyl isobutyl ketone, methyl amyl ketone and butyl acetate which do not meet the stated criteria with respect to miscibility with water, have not been found suitable for the same purpose, although the ultimate reason for such selectivity in the manner of operability is obscure.

When an organic solvent of suitable water miscibility is selected, and sufficient water is totally available in the bound and free state, as referred to above, it has been found that conversion of the acid addition salt of D-6-(2-amino - 2 - phenylacetamido)penicillanic acid with β-naphthalene sulfonic acid to the anhydrous form of ampicillin may be carried out within the pH range of from about 5.5 to about 8.5 (provided there is sufficient water present to render a pH determination possible). Optimum conversion yields appear to occur when the pH is maintained within the higher portion of the range, although control of the pH is not absolutely necessary to operability of the method, other than, at a higher pH than 8.5, destruction of the penicillin nucleus tends to occur. Conversion itself is caused to occur by maintaining the organic solvent, water and the said acid addition salt of ampicillin systems described within the temperature range of from about 50° C. to about 100° C.

As has been indicated hereinabove, in connection with mention of specific embodiments, and as will be obvious to those skilled in the art after considering the instant disclosure, a number of different ways of preparing the reaction mixture can be used. Merely by way of illustration, the process can be carried out by the addition of an undried acid addition salt to an organic solvent, e.g., isopropyl alcohol at about 25° C., then adding an amine e.g., diethylamine or ammonia, then stirring for 10 minutes followed by the addition of dilute mineral acid, e.g., hydrochloric acid and then by rapid agitation and heating to 75–80° C. for 20 minutes. Alternatively, the conversion can be accomplished by the addition of the acid addition salt of ampicillin to a hot organic solvent, e.g., isopropyl alcohol solution of an amine, e.g., diethylamine or ammonia, and a mineral acid, e.g., hydrogen chloride, heating and stirring at 75–80° C. for 20 minutes as above. Or, the acid addition salt of ampicillin can be added to a hot organic solvent, e.g., isopropanol solution of amine, e.g., diethylamine or ammonia with the usual heating time. The amount of amine it is preferred to employ is from at least about one stoichiometric equivalent, based on the acid addition salt, up to from about 3 to about a 10% excess. While somewhat less than one equivalent can be used, the purity of the product will suffer because of incomplete conversion and the use of excesses greater than 10% is not advantages because there is then a tendency for the yield to decrease. All of these techniques are exemplified in detail hereinafter.

DESCRIPTION OF THE PREFERRED EMBODIMENT

The following examples illustrate the best mode contemplated of using the claimed processes of the invention. They are merely illustrative and are not to be construed as limiting the scope of the claims in any manner whatsoever.

Example I

In the following procedure the amount of amine used is adjusted to 2 moles per mole of ampicillin β-naphthalene sulfonic acid salt.

To a 50 ml. 3-neck flask fitted with a reflux condenser, stirrer, and thermometer, charge 75 g. of wet acid addition salt of D-6-(2-amino-2-phenylacetamido)penicillinic acid with β-naphthalene sulfonic acid (25.5–31.0 g. calculated as dry monohydrate) and 250 ml. of isopropanol.

With rapid stirring at 20–25° C., add 12–15 ml. of diethylamine and allow the mixture to stir for 10 minutes; pH 8.4–9.9. Without delay, adjust the mixture to pH 5.9–6.1 using approx. 6–8 ml. of 6 N hydrochloric acid; the mixture forms a viscous gel, but is stirrable. Accurate adjustment of the pH is critical at this point. If the pH drops below 5.9, adjust with diethylamine (1 ml. of diethylamine neutralizes about 1.2 ml. of 6 N HCl).

With vigorous stirring, heat the mixture as rapidly as possible to 75° C. and allow to stir at 75–80° C. for 20 minutes; the mixture becomes fluid and white at about 70° C. as the anhydrous form crystallizes.

Filter the mixture without cooling. Wash the filter cake 2 x 15 ml. of 85% isopropanol and dry in an air oven at 45–50° C.

The procedure is repeated, substituting a stoichiometricaly equivalent amount of concentrated aqueous ammonia for the diethylamine. Substantially the same results are obtained.

Example II

In the following procedure, 1 equivalent of ampicillin-β-naphthalene sulfonic acid salt is added to a hot solution of 1.9 equivalents of amine an 0.8 equivalent of strong mineral acid. This method has the advantage of giving nearly instantaneous conversion without going through the thick gelations stage observed in the prior procedure.

Charge a 500 ml. three-necked flask which is equipped with stirrer, thermometer and condenser, with 110 ml. of anhydrous isopropanol. With stirring, add 26.4 ml. (about 0.19 mole) of diethylamine, and 13.3 (0.08 M) of 6 N hydrochloric acid. Heat the solution to 75–80° C. Add to the hot solution as rapidly as possible and with good agitation, 107.5 g. wet (57.6 g. dry), 0.1 M, of ampicillin β-naphthaline sulfonic acid addition salt. Temperature will fall to 70–75° C. Continue heating to bring temperature to 80° C. and maintain for 15 minutes. Begin time when temperature reaches 75° C.

Without cooling, filter the hot slurry through a Buchner funnel. Filtration is very fast. As soon as the cake is free of liquid, wash with 25 ml. of 85% isopropanol. Repeat with a second wash of 25 ml. of 85% isopropanol then remove as much solvent as possible. Dry in thin layers in an air oven at 50° C.

The procedure is repeated, substituting a stoichiometrically equivalent amount of concentrated aqueous ammonia for the diethylamine. Substantially the same results are obtained.

Example III

In the following procedure, 1 equivalent of ampicillin β-naphthalene sulfonic acid addition salt is added to only 1 equivalent of amine. This gives a slightly higher yield, eliminates the need for pH adjustment with strong mineral acid and eliminates the formation of a gelatinous phase during conversion and a heat-up period of approximately 20 minutes.

Charge a 500 ml. three-necked flask, which is equipped with stirrer, thermometer, and condenser, with 110 ml. of anhydrous isopropanol. With stirring, add 7.3 g. (about 0.10 mole) of diethylamine. Heat the solution to 75–80° C. Add to the hot solution as rapidly as possible, and with good agitation, 107.5 g. wet (57.6 g. dry), 0.1 mole, of ampicillin β-naphthalene sulfonic acid salt. Temperature will fall to 70–75° C. Continue heating to bring temperature to 80° C. and maintain for 15 minutes. Begin time when temperature reaches 75° C.

Without cooling, filter the hot slurry through a Buchner funnel. Filtration is very fast. As soon as the cake is free of liquid, wash with 25 ml. of 85% isopropanol. Repeat with a second wash of 25 ml. of 85% isopropanol then remove as much solvent as possible. Dry in thin layers in an air oven at 50° C.

Yield, 28.1 g., 80.4% of theory.

The procedure is repeated substituting a stoichiometrically-equivalent amount of concentrated aqueous ammonia for the diethylamine. Substantially the same results are obtained.

Example IV

Scale up of the foregoing procedures to 200-gallon equipment has indicated an operational difficulty not evident in laboratory or in 50-gallon pilot plant conversions. When operating on the 200-gallon level it becomes impossible to add the ampicillin β-naphthalene sulfonic acid addition salt to the hot organic solvent as rapidly as can be done on the smaller scale. Addition times of 20 to 30 minutes are required, thus a goodly portion of the salt is exposed to a high concentration of amine for a considerable length of time. This tends to cause the yield of product to decrease. The following procedure is an embodiment which eliminates this difficulty by adding the amine and acid addition salt alternately to the hot organic solvent in portions proportional to the final concentration of reactants. Laboratory additions are made in ten portions over a period of approximately 20 minutes. On a plant basis, the number of additions are varied according to convenience, providing the desired ratio of amine to acid addition salt is maintained.

Charge a 1 l. three-necked flask, which is equipped with stirrer, thermometer, and condenser, with 330 ml. of anhydrous isopropanol. Heat to 70° C. with stirring, add one-tenth of the diethylamine, 4.6 ml., immediately followed by one-tenth of the wet ampicillin β-naphthalene sulfonic acid salt, 29 g. Continue the alternate additions of diethylamine and salt while maintaining the temperature at 70°±3° C., until all of the reactants (46 ml. of diethylamine and 290 g. of wet salt containing 172.8 g. of dry solids) have been added. Make the additions as rapidly as practical; the total addition time not to exceed twenty-five minutes. After the final addition of acid addition salt, heat the mixture to 75–80° C. as rapidly as possible. Maintain at 75–80° C. for fifteen minutes.

Without cooling, filter the hot slurry through a Buchner funnel. Filtration is very fast. As soon as the cake is free of liquid, break the vacuum and flood the cake with 90 ml. of anhydrous isopropanol. Again apply vacuum until the liquid is removed from the cake. Repeat this washing process two more times each with 90 ml. of anhydrous isopropanol. After the final wash, remove as much solvent as possible, then remove from filter and dry in thin layers in an air oven at 50° C.

The procedure is repeated substituting a stoichiometrically-equivalent amount of concentrated aqueous ammonia for the diethylamine. Substantially the same results are obtained.

Example V

The procedure of Example I is repeated substituting for the diethylamine, stoichiometrically-equivalent amounts of the following primary and secondary lower aliphatic amines: methylamine, ethylamine, n-propylamine, i-propylamine, n-butylamine, t-butylamine, n-pentylamine, n-hexylamine, 3 - methylpentylamine, benzylamine, 6-phenyl-n-hexylamine, dimethylamine, di-n-propylamine, di-n-butylamine, di-t-butylamine, di-n-pentylamine, di-n-hexylamine and di-(3-methylpentyl)amine di-(6-phenyl-n-hexyl)amine. Anhydrous D-6-(2-amino-2-phenylacetamido)penicillanic acid is obtained in good yield.

Example VI

The procedure of Example III is repeated substituting diisopropylamine, 10.1 g., 0.10 mole, for the diethylamine. The yield of anhydrous ampicillin is 83.0%; assay 96.6%.

The procedure of Example III is repeated substituting dibenzylamine, 19.7 g., 0.10 mole, for the diethylamine. The yield of anhydrous ampicillin is 76.6%; assay 98.1%.

Example VII

Ammonium hydroxide, 8.0 ml. of concentrated aqueous solution, is added to 75 g. of wet ampicillin β-naphthalene sulfonic acid salt in 250 ml. of isopropanol. The pH is adjusted to 4.0 with dilute hydrochloric acid and the temperature is raised to 75° C. and held at 75–80° C. for 20 minutes. The solid is filtered off without cooling and is washed 2 times with 20 ml. of 85% isopropanol. The product is dried in an air oven at 50–55° C. The yield of anhydrous ampicillin is 75%; assay 93.8%.

We claim:

1. A method for the preparation of the anhydrous crystalline form of D-6-(2-amino-2-phenylacetamido)penicillanic acid, which method comprises heating at a temperature of from about 50° C. to about 100° C. a mixture comprising (1) the acid addition salt of D-6-(2-amino-2-phenylacetamido)penicillanic acid with β-naphthalene sulfonic acid, (2) at least about 1 equivalent, based on said salt, of an amine of the formula

wherein R and $R^1$ are, independently, hydrogen (lower)alkyl or phenyl-substituted-(lower)alkyl, and (3) a reaction medium comprising, (a) a water-miscible organic solvent capable of dissolving at least 5% thereof of water, and present in an amount that is at least 20% by volume of said medium, and (b) sufficient free water to bring the total amount of bound and free water in the mixture to at least 10% by weight based on solids and total water present until formation of said anhydrous crystalline form is substantially complete.

2. A method as defined in claim 1 including the steps of separating and recovering said anhydrous crystalline form of D-6-(2-amino - 2 - phenylacetamido)penicillanic acid free of the by-product amine-β-naphthalene sulfonic acid addition salt, water-miscible organic solvent and free water components in said mixture.

3. A method as defined in claim 1 wherein said acid addition salt is in the form of a monohydrate and said amine is diethylamine.

4. A method as defined in claim 1 wherein said water-miscible organic solvent comprises from about 50% to about 95% by volume of said medium and said heating occurs in the temperature range of from about 60° C. to about 85° C.

5. A method as defined in claim 1 wherein said water-miscible organic solvent is isopropanol which comprises about 85% by volume of said medium and said heating occurs in the temperature range of from about 70° C. to about 80° C.

6. A method as defined in claim 1 wherein the said mixture is prepared by adding about one equivalent of said acid addition salt to a warm solution of about one equivalent of diethylamine in said reaction medium, wherein the water-miscible organic solvent is isopropanol, heated to a temperature range of from about 50° C. to about 100° C.

7. A method as defined in claim 6 wherein the said mixture is prepared in a step-wise fashion by adding increments of said acid addition salt to stoichiometrically-equivalent increments of said amine in said warm solution, at a temperature range of from about 70° C. to about 80° C.

References Cited

UNITED STATES PATENTS 3,157,640  11/1964  Johnson et al. _____ 260—239.1

NICHOLAS S. RIZZO, Primary Examiner

PO-1050
(5/69)

UNITED STATES PATENT OFFICE
CERTIFICATE OF CORRECTION

Patent No. 3,487,073           Dated December 30, 1969

Inventor(s) Arthur C. Adams and Robert P. Deist

It is certified that error appears in the above-identified patent and that said Letters Patent are hereby corrected as shown below:

Column 2, line 44, for "percursor" read --precursor--; column 6, line 13, for "advantages" read --advantageous--; column 6, line 57, for "an" read --and--; column 8, line 70, after "acid", the word --substantially-- should be inserted.

SIGNED AND
SEALED
JUN 30 1970

(SEAL)
Attest:

Edward M. Fletcher, Jr.
Attesting Officer

WILLIAM E. SCHUYLER, JR.
Commissioner of Patents